US010284328B2

(12) United States Patent
Sen et al.

(10) Patent No.: US 10,284,328 B2
(45) Date of Patent: May 7, 2019

(54) MOTION-AWARE MODULATION AND CODING SCHEME ADAPTATION

(71) Applicant: Hewlett Packard Enterprise Development LP, Houston, TX (US)

(72) Inventors: Souvik Sen, Mountain View, CA (US); Li Sun, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 211 days.

(21) Appl. No.: 15/307,505

(22) PCT Filed: Jun. 13, 2014

(86) PCT No.: PCT/US2014/042313
§ 371 (c)(1),
(2) Date: Oct. 28, 2016

(87) PCT Pub. No.: WO2015/191081
PCT Pub. Date: Dec. 17, 2015

(65) Prior Publication Data
US 2017/0054525 A1 Feb. 23, 2017

(51) Int. Cl.
*H04L 1/00* (2006.01)
*H04L 1/18* (2006.01)
(Continued)

(52) U.S. Cl.
CPC .......... *H04L 1/0003* (2013.01); *H04L 1/1825* (2013.01); *H04L 5/006* (2013.01);
(Continued)

(58) Field of Classification Search
CPC ..... H04L 1/0003; H04L 1/0009; H04L 5/006; H04L 5/0055; H04L 1/1825; H04L 1/1893; H04W 4/026; H04W 88/08; H04W 84/12
See application file for complete search history.

(56) References Cited

U.S. PATENT DOCUMENTS 7,519,011 B2  4/2009 Petrus et al.
8,463,296 B2  6/2013 Huber et al.
(Continued)

OTHER PUBLICATIONS

Choliz et al, "Algorithms and Strategies for Communication Systems with Location Awareness", May 4, 2010.

*Primary Examiner* — Will W Lin
(74) *Attorney, Agent, or Firm* — Mannava & Kang, P.C.

(57) ABSTRACT

According to an example, motion-aware MCS adaptation may include determining whether a device is static relative to a wireless AP, moving towards the wireless AP, or moving away from the wireless AP. A device static rate probing interval, a device moving rate probing interval, first and second frame retransmission limits, a device static PER smoothing factor, and a device moving PER smoothing factor may be determined. In response to a determination that the device is static relative to the wireless AP, moving towards the wireless AP, or moving away from the wireless AP, an appropriate rate probing interval, an appropriate frame retransmission limit, and an appropriate PER smoothing factor may be used to determine a MCS value from a plurality of available MCS values to be used for transmitting data between the device and the wireless AP.

15 Claims, 6 Drawing Sheets

(51) Int. Cl.
   *H04L 5/00*   (2006.01)
   *H04W 4/02*   (2018.01)
   *H04W 84/12*   (2009.01)
   *H04W 88/08*   (2009.01)

(52) U.S. Cl.
   CPC ........... *H04L 5/0055* (2013.01); *H04W 4/026* (2013.01); *H04L 1/1893* (2013.01); *H04W 84/12* (2013.01); *H04W 88/08* (2013.01)

(56) References Cited

U.S. PATENT DOCUMENTS

| | | | |
|---|---|---|---|
| 8,638,653 B2 | 1/2014 | Hamzeh et al. | |
| 9,853,753 B2* | 12/2017 | Lu | H04W 24/02 |
| 2008/0086662 A1* | 4/2008 | Li | H04L 1/0003 |
| | | | 714/704 |
| 2008/0137577 A1* | 6/2008 | Habetha | H04W 28/22 |
| | | | 370/311 |
| 2009/0116589 A1 | 5/2009 | Zhang | |
| 2009/0276674 A1 | 11/2009 | Wei et al. | |
| 2010/0080176 A1* | 4/2010 | Maas | H04L 1/0015 |
| | | | 370/329 |
| 2010/0218198 A1 | 8/2010 | Ruan et al. | |
| 2010/0255781 A1* | 10/2010 | Wirola | G01S 19/34 |
| | | | 455/41.2 |
| 2011/0310837 A1 | 12/2011 | Classon | |
| 2012/0243430 A1* | 9/2012 | Song | H04L 1/0015 |
| | | | 370/252 |
| 2013/0039270 A1* | 2/2013 | Strinati | H04L 1/0003 |
| | | | 370/328 |
| 2013/0051380 A1 | 2/2013 | Lundgren et al. | |
| 2013/0298170 A1 | 11/2013 | ElArabawy et al. | |
| 2013/0310092 A1* | 11/2013 | Tabet | H04L 1/0003 |
| | | | 455/501 |
| 2015/0124709 A1* | 5/2015 | Ren | H04L 5/006 |
| | | | 370/329 |

\* cited by examiner

500

DETERMINE WHETHER A DEVICE IS STATIC RELATIVE TO A
WIRELESS AP, OR MOVING RELATIVE TO THE WIRELESS AP
502

DETERMINE A RATE PROBING INTERVAL, A FRAME RETRANSMISSION
LIMIT, AND A PER SMOOTHING FACTOR BASED ON WHETHER THE DEVICE
IS DETERMINED TO BE STATIC RELATIVE TO THE WIRELESS AP, OR
MOVING RELATIVE TO THE WIRELESS AP TO DETERMINE A MCS VALUE
FROM A PLURALITY OF AVAILABLE MCS VALUES TO BE USED FOR
TRANSMITTING DATA BETWEEN THE DEVICE AND THE WIRELESS AP
504

FIG. 5

MOTION-AWARE MODULATION AND CODING SCHEME ADAPTATION

BACKGROUND

A modulation and coding scheme (MCS) is typically used in wireless networks to describe the combination of a radio carrier modulation scheme and a coding scheme that are used when transmitting data. Different MCSs typically include different associated data transmission rates. As the number of smartphones, tablets, and other such devices continues to increase, the number of data accesses from access points (APs) also continues to increase. Users of smartphones, tablets, and other such devices bring mobility in Wi-Fi networks. This mobility typically affects choice of the best MCS that is to be used for transmitting data between such devices and the Wi-Fi APs.

BRIEF DESCRIPTION OF DRAWINGS

Features of the present disclosure are illustrated by way of example and not limited in the following figure(s), in which like numerals indicate like elements, in which:

FIG. 5 illustrates further details of the method for motion-aware MCS adaptation, according to an example of the present disclosure.

DETAILED DESCRIPTION

Figure 1:
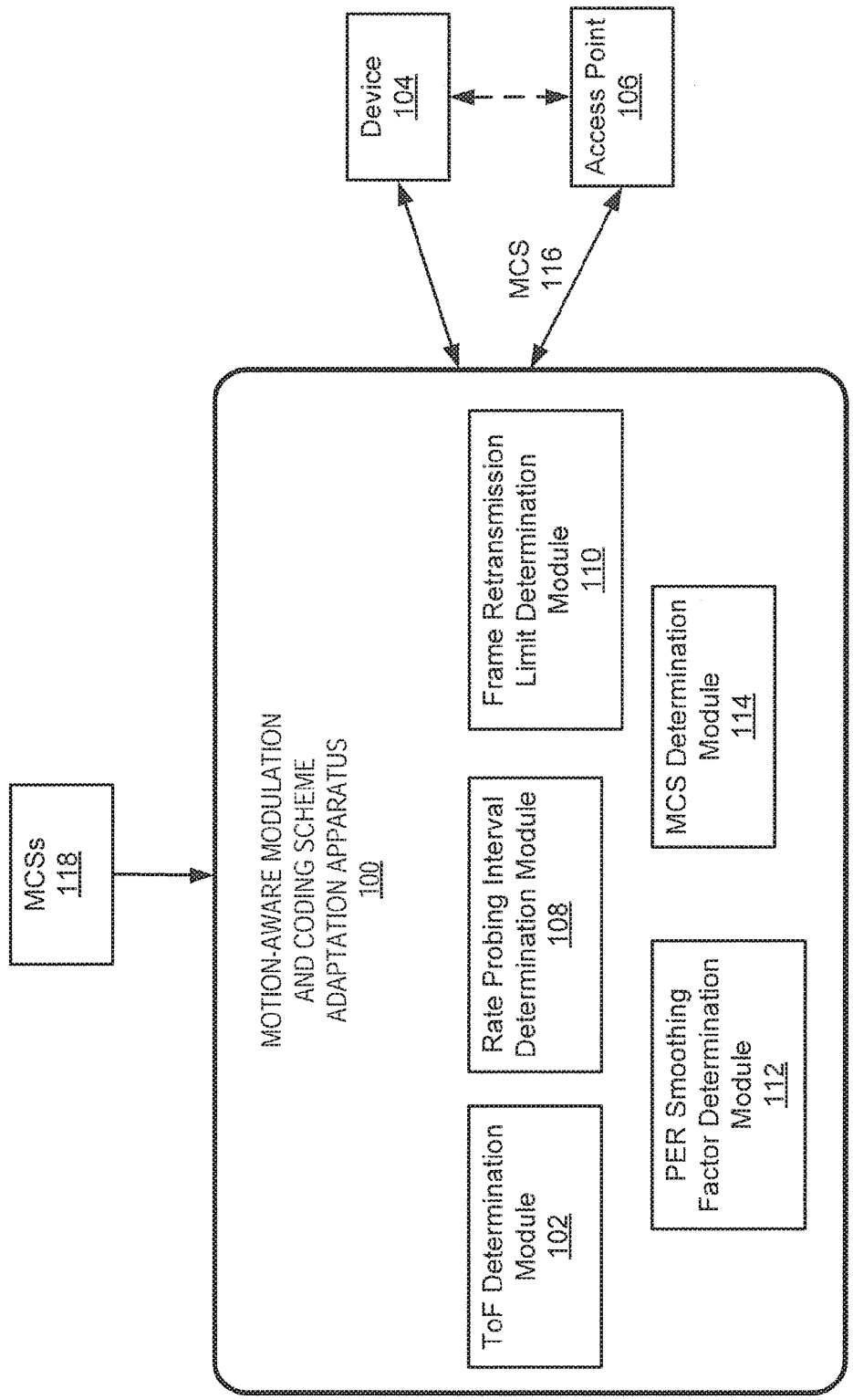
FIG. 1 illustrates an architecture of a motion-aware MCS adaptation apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to smartphones, tablets, and other such devices that bring mobility in Wi-Fi networks, the aspect of mobility adds challenges to the task of rate adaptation to find the best MCS for transmitting data between such devices and Wi-Fi APs. MCS control uses different treatment with respect to data transmission when a device is in motion versus when a device is static. This is because the communication channel between a device and a Wi-Fi AP changes rapidly such that historical information associated with the communication channel may become stale when the device is in motion.

With respect to MCS selection, evolution of standards, such as the IEEE 802.11 standards brings faster wireless connections and more MCSs therewith. With multiple-input and multiple-output (MIMO) technology, an IEEE 802.11n device may support more than thirty-two different MCSs. Other standards, such as, for example, the IEEE 802.11ac standard may support greater MCSs compared to the IEEE 802.11n standard. In order to maximize throughput and improve user experience, the best MCS on a given Wi-Fi link is identified. The best MCS may include an MCS that provides the highest data transmission rate, as well as the highest link quality for data transmission. However, as the number of MCSs increases, selection of the best MCS also becomes more challenging since link quality between a device and a Wi-Fi AP varies spatially, temporally, and rapidly. The proliferation of mobile devices equipped with Wi-Fi chipsets, e.g., smartphones and tablets, may further aggravate the link quality between a device and a Wi-Fi AP.

A Wi-Fi device may rely on automatic rate adaptation to estimate the best MCS. However, rate adaptation may not identify the best MCS since it primarily relies on history data to improve MCS estimation accuracy. When a Wi-Fi device is moving during data transmission, the movement of the device may result in incorrectness of MCS estimation because the link between the device and the Wi-Fi AP tends to vary more at faster speeds, and the variation may not be immediately reflected in history. In this regard, incorrect MCS selection may result in a relatively large performance degradation, and further negatively impact user experience.

In order to improve link performance to AP clients, a motion-aware MCS adaptation apparatus and a method for motion-aware MCS adaptation are disclosed herein. The apparatus and method disclosed herein provide for MCS adaptation for mobile devices without impacting static devices. The apparatus and method disclosed herein apply different strategies for MCS control based on whether a device is mobile versus static.

According to examples disclosed herein, the motion-aware MCS adaptation apparatus may include a processor, and a memory storing machine readable instructions that when executed by the processor cause the processor to determine whether a device is static relative to a wireless AP, moving towards the wireless AP, or moving away from the wireless AP by determining time-of-flight (ToF) for signals transmitted between the device and the wireless AP. The machine readable instructions may further determine a rate probing interval, a frame retransmission limit, and a packet error ratio (PER) smoothing factor. In response to a determination that the device is static relative to the wireless AP, moving towards the wireless AP, or moving away from the wireless AP, the machine readable instructions may further use the determined rate probing interval, the frame retransmission limit, and the PER smoothing factor to determine a MCS value from a plurality of available MCS values to be used for transmitting data between the device and the wireless AP.

FIG. 1 illustrates an architecture of a motion-aware MCS adaptation apparatus (hereinafter also referred to as "apparatus 100"), according to an example of the present disclosure. Referring to FIG. 1, the apparatus 100 is depicted as including a ToF determination module 102 to determine whether a device 104 is static or mobile relative to an AP 106. According to an example, the device 104 may include a smartphone, tablet, and other such devices. According to an example, the AP 106 may include a WiFi AP. The device 104 may include a plurality of devices that are to transmit data to/from the AP 106 which may include a plurality of APs. A rate probing interval determination module 108 is to determine how frequently the AP 106 (e.g., one of the APs) is to use a higher MCS value for data (e.g., packet) transmission to the device 104 (e.g., one of the devices). A frame retransmission limit determination module 110 is to determine how many times a failed frame transmission is to be retried with the same MCS before trying a lower MCS. A PER smoothing factor determination module 112 is to maintain a PER history for rate evaluation. A MCS determination module 114 may use the ToF determination, the rate probing interval, the frame retransmission limit, and the PER smoothing factor to determine an appropriate MCS 116 from a plurality of available MCSs 118 to be used for transmitting data between the device 104 and the AP 106. According to an example, the apparatus 100 may be implemented as part of the device 104 and/or the AP 106, or separately as shown in FIG. 1.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

The ToF determination module 102 is to determine whether the device 104 is static or mobile relative to the AP 106. The ToF may capture the propagation delay between a transmitter at the device 104 or the AP 106, and a receiver at the other one of the AP 106 or the device 104. According to an example, the ToF may be determined from a wireless driver of the AP 106. In order to determine the ToF between the device 104 and the AP 106, the AP 106 may send a NULL data frame to the device 104. For example, the AP 106 may send a data frame that includes an 802.11 frame control field, type 10, and subtype 0100. The device 104, even if it is not associated with the AP 106, may reply with an acknowledgement (ACK), for example, as specified in the IEEE 802.11 standard.

Figure 2:
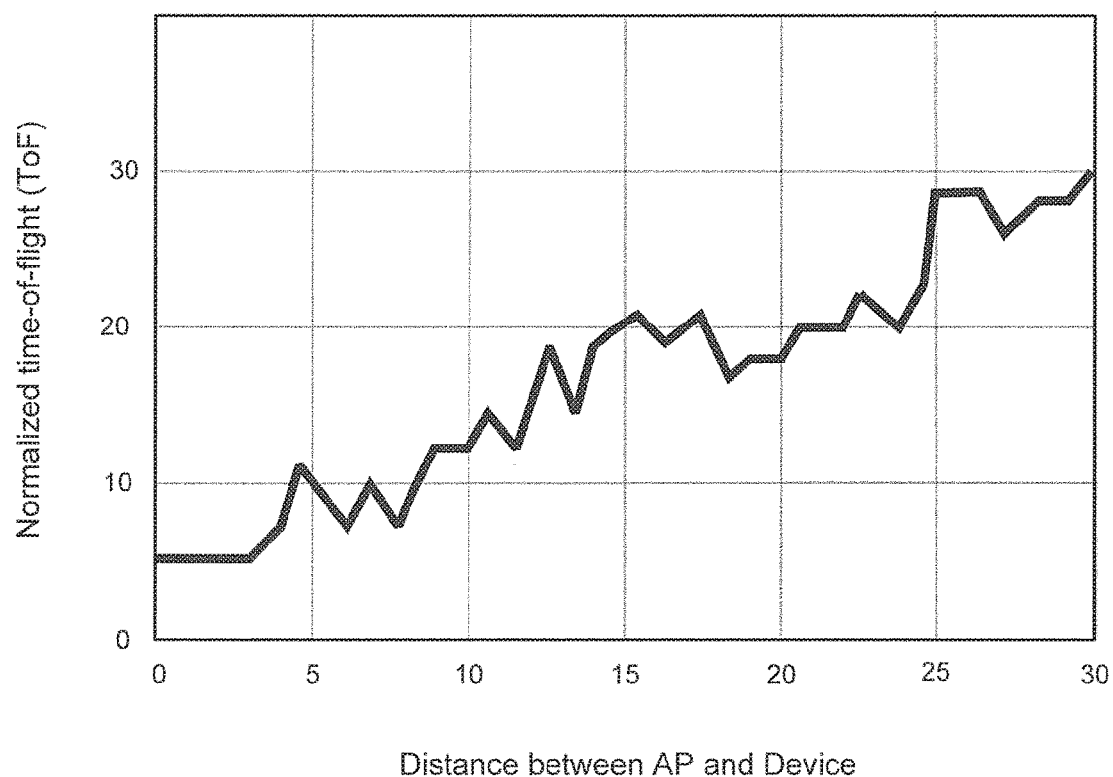
FIG. 2 illustrates normalized time-of-flight (ToF) values between an AP and a device that uses the AP for data access for increasing device distance, according to an example of the present disclosure.

FIG. 2 illustrates normalized ToF values between an AP and a device that uses the AP for data access for increasing device distance, according to an example of the present disclosure. Referring to FIG. 2, the ToF is proportional to the distance between a transmitter (e.g., at the device 104 or the AP 106) and a receiver (e.g., at the other one of the AP 106 or the device 104). The ToF information may be used to determine the distance between the device 104 and the AP 106, and to further determine whether the device 104 is mobile. The change in a ToF value may be further used to determine whether the device 104 is approaching or moving away from the AP 106. For example, if the ToF is increasing (e.g., see FIG. 2), the ToF determination module 102 may determine that the device 104 is heading away from the AP 106. Otherwise if the ToF is decreasing, the ToF determination module 102 may determine that the device 104 is approaching the AP 106, With multiple APs, the correctness of device mobility detection may be further confirmed.

As described herein, the rate probing interval determination module 108 may determine how frequently the AP 106 (e.g., one of the APs) is to use a higher MCS (e.g., the next higher MCS) for data transmission to the device 104 (e.g., one of the devices). For example, once a highest MCS is selected for data transmission (e.g., MCS #18 out of MCSs 1-32), the rate probing interval determination module 108 may determine how frequently the AP 106 is to use a higher MCS (e.g., MCS #19) for data transmission to the device 104. For the rate probing interval determination module 108, if a current MCS (e.g., the MCS 116) is successful for the rate probing interval, the MCS determination module 114 may determine that the device 104 may support a higher MCS, and try a higher MCS. Depending on whether the transmission at this higher MCS is successful, the MCS determination module 114 may update the MCS of the device 104. For a static device 104, the rate probing interval determination module 108 may fix a static rate probing interval ($t_0$). For example, the rate probing interval determination module 108 may fix a static rate probing interval ($t_0$) at 50 milliseconds. The static rate probing interval ($t_0$) may also be used if the device 104 is moving away from the AP 106. If the device 104 is moving towards the AP 106, the channel quality is likely to improve. Thus the rate probing interval determination module 108 may apply a shorter rate probing interval ($t_1$) to promote a faster rate. For example, the rate probing interval determination module 108 may apply a shorter rate probing interval of 20 milliseconds to promote a faster rate.

As described herein, the frame retransmission limit determination module 110 may determine how many times a failed frame transmission is to be retried with the same MCS value before trying a lower MCS value. In this regard, when the device 104 is moving towards the AP 106, channel quality is expected to improve. Hence, the MCS determination module 114 may maintain the MCS value that is applied (i.e., not drop the MCS value). In this case, a certain number of frame retransmissions at the same rate benefits transmission efficiency because retransmissions may be executed the AP 106 hardware without interrupting a host central processing unit (CPU) to thus try a lower MCS value. The execution of the retransmissions by the AP 106 hardware may add further speed and efficiency to the retransmission process. However, when the device 104 is moving away and channel quality is expected to degrade, a smaller number for the frame retransmission limit may be used to make the rate drop faster. The frame retransmission limit determination module 110 may apply two different frame retransmission limits, i.e., $l_1$ and $l_0$, in which $l_1 > l_0$. If the device 104 is moving towards the AP 106, the MCS determination module 114 may use $l_1$ (i.e., retry frame transmission a greater number of times), and in all other scenarios, the MCS determination module 114 may use $l_0$.

As described herein, the PER smoothing factor determination module 112 may maintain a PER history for rate evaluation. For each rate, the average PER may be logged by the PER smoothing factor determination module 112, and an average PER may be updated after a frame transmission with a certain rate. For example, for a rate #1, a probability of success may be logged by the PER smoothing factor determination module 112, for a rate #2, a probability of success may be logged by the PER smoothing factor determination module 112, etc. According to an example, the PER smoothing factor determination module 112 may use the following equation for average PER determination:

$$PER_{avg} = \alpha * PER_{avg} + (1-\alpha) * PER_{new} \quad \text{Equation (1)}$$

For Equation (1), $PER_{avg}$ may represent the average PER value from the past, $PER_{new}$ may represent the new PER for the last transmission, and $\alpha$ may represent the PER smoothing factor. A larger PER smoothing factor will take into account more history information and make average PER changes relatively slowly. Similarly, a smaller PER smoothing factor will take into account less history information and make average PER changes relatively faster. Thus, the PER smoothing factor may govern how much history information is to be considered to determine the MCS value. In this regard, if the device 104 is mobile, the previous PER values may not be a good indicator of the MCS. Instead, PER values that are obtained recently may be used. Thus, if the device 104 is mobile, the MCS determination module 114 may use a smaller value of $\propto (\alpha_1)$ to de-emphasize the PER estimates from history (i.e., use a shorter history). According to an example, $\alpha_1$ may be ¼. However, if the device 104 is static, the MCS determination module 114 may use the past information (i.e., a longer history) to choose better rates, and thus use a larger value of $\propto (\alpha_0)$, According to an example, $\alpha_0$ may be ⅟16. According to an example, $\alpha_1$ and $\alpha_0$ may be determined as an inverse of a number of packet histories that are to be inspected.

The MCS determination module 114 may use the ToF determination, the rate probing interval, the frame retransmission limit, and the PER smoothing factor to determine an appropriate MCS 116 of the plurality of available MCSs 118 to be used for transmitting data between the device 104 and the AP 106. The parameters that include the rate probing interval, the frame retransmission limit, and the PER smoothing factor may be chosen based on whether the device 104 is static or whether the device 104 is moving towards or away from the AP 106. For example, when the device 104 is in a static state, the MCS determination module 114 may choose parameters to probe higher rates intermittently, and use the historical PERs to choose better MCS values. However if the device 104 is moving towards or away from the AP 106, PERs from the past are not a good indicator of MCS values. Thus, the MCS determination module 114 may use recent PER values. Further, if the device 104 is moving towards the AP 106, the MCS determination module 114 may postulate that the device 104 may be able to support higher MCS values. Thus the MCS determination module 114 may probe higher rates faster, and further drop the rate after retrying at the current rate multiple times.

Figure 3:
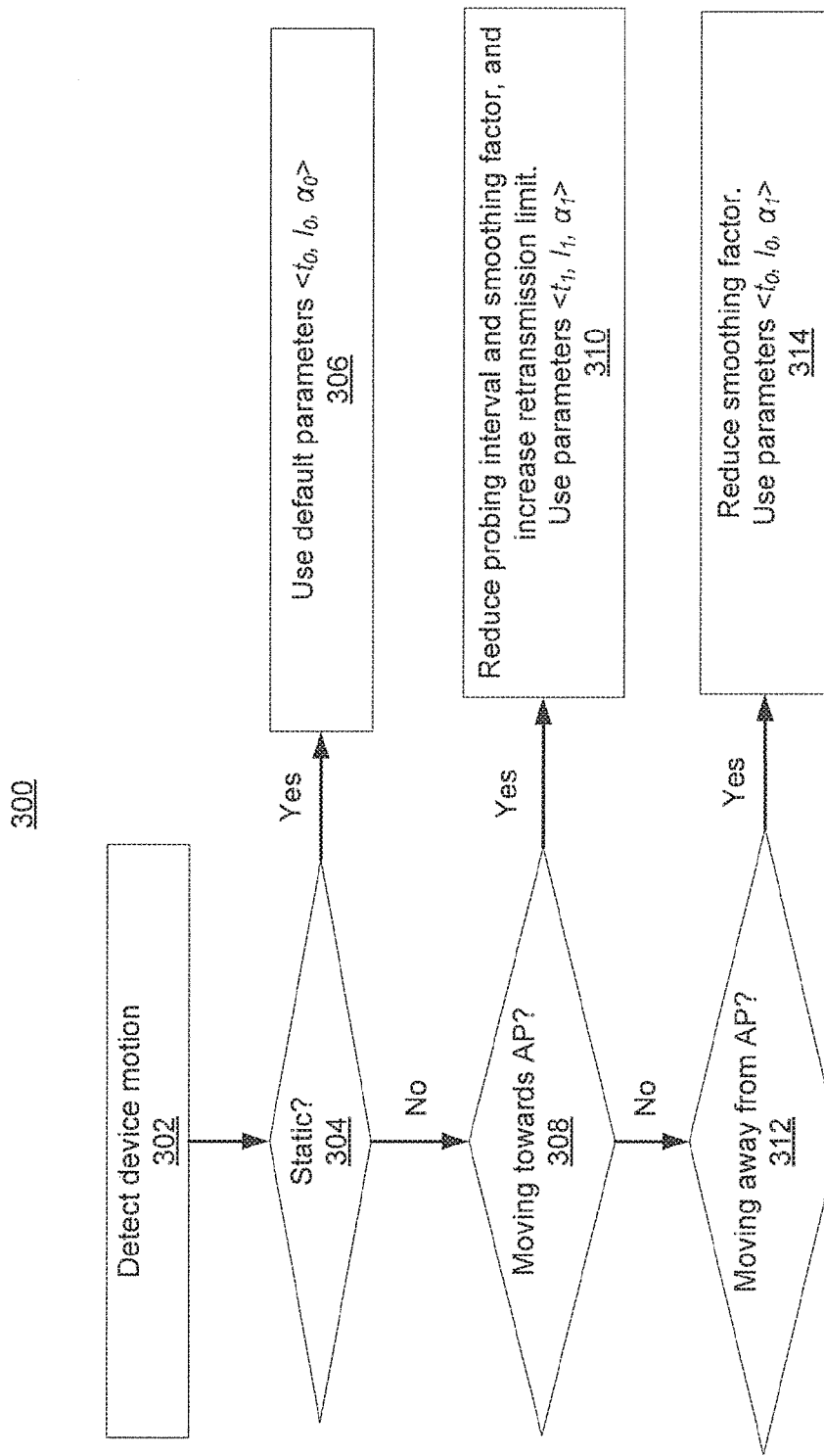
FIG. 3 illustrates a flowchart for motion-aware MCS adaptation, according to an example of the present disclosure.

FIG. 3 illustrates a flowchart 300 for motion-aware MCS adaptation, according to an example of the present disclosure. Referring to FIG. 3, at block 302, the ToF determination module 102 may determine whether the device 104 is static or mobile relative to the AP 106.

At block 304, based on a determination that the device 104 is static, at block 306, the MCS determination module 114 may use the a rate probing interval $t_0$, a frame retransmission limit $l_0$, and a PER smoothing factor $\alpha_0$ to determine the appropriate MCS 116.

At block 308, based on a determination that the device 104 is moving towards the AP 106, at block 310, the MCS determination module 114 may use the a rate probing interval $t_1$, a frame retransmission limit $l_1$, and a PER smoothing factor $\alpha_1$ to determine the appropriate MCS 116. Compared to the rate probing interval $t_0$, frame retransmission limit $l_0$, and PER smoothing factor $\alpha_0$ for the static device 104, for the device 104 moving towards the AP 106, the rate probing interval and the PER smoothing factor may be reduced, and the frame retransmission limit may be increased.

At block 312, based on a determination that the device 104 is moving away from the AP 106, at block 314, the MCS determination module 114 may use the a rate probing interval $t_0$, a frame retransmission limit $l_0$, and a PER smoothing factor $\alpha_1$ to determine the appropriate MCS 116. Compared to the rate probing interval $t_0$, frame retransmission limit $l_0$, and PER smoothing factor $\alpha_0$ for the static device 104, for the device 104 moving away from the AP 106, the PER smoothing factor may be reduced.

Figure 4:
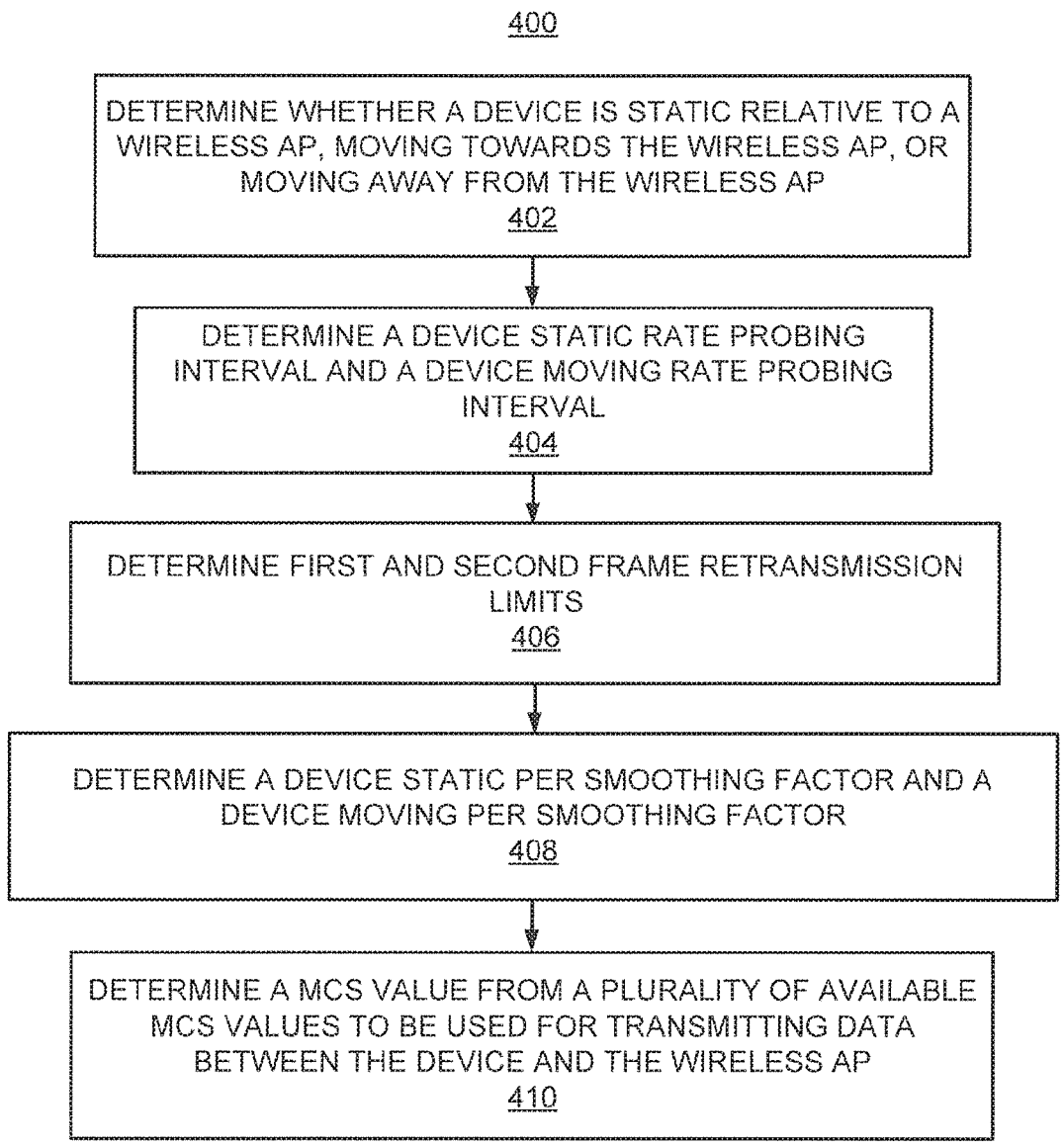
FIG. 4 illustrates a method for motion-aware MCS adaptation, according to an example of the present disclosure.

FIGS. 4 and 5 respectively illustrate flowcharts of methods 400 and 500 for MCS adaptation, corresponding to the example of the motion-aware MCS adaptation apparatus 100 whose construction is described in detail above. The methods 400 and 500 may be implemented on the motion-aware MCS adaptation apparatus 100 with reference to FIGS. 1-3 by way of example and not limitation. The methods 400 and 500 may be practiced in other apparatus.

Referring to FIG. 4, for the method 400, at block 402, the method may include determining whether a device is static relative to a wireless AP, moving towards the wireless AP, or moving away from the wireless AP. For example, referring to FIG. 1, the ToF determination module 102 may determine whether the device 104 is static relative to the wireless AP 106, moving towards the wireless AP 106, or moving away from the wireless AP 106.

At block 404, the method may include determining a device static rate probing interval and a device moving rate probing interval to determine how frequently the wireless AP is to use a higher MCS value for data transmission to the device. For example, referring to FIG. 1, the rate probing interval determination module 108 may determine a device static rate probing interval and a device moving rate probing interval to determine how frequently the wireless AP 106 is to use a higher MCS value for data transmission to the device 104.

At block 406, the method may include determining first and second frame retransmission limits to determine a number of times a failed frame transmission is to be retried with a same MCS value before using a lower MCS value. The first frame retransmission limit is greater than the second frame retransmission limit. For example, referring to FIG. 1, the frame retransmission limit determination module 110 may determine first and second frame retransmission limits to determine a number of times a failed frame transmission is to be retried with a same MCS value before using a lower MCS value.

At block 408, the method may include determining a device static PER smoothing factor and a device moving PER smoothing factor to maintain a PER history for rate evaluation. For example, referring to FIG. 1, the PER smoothing factor determination module 112 may determine a device static PER smoothing factor and a device moving PER smoothing factor to maintain a PER history for rate evaluation.

At block 410, in response to a determination that the device is static relative to the wireless AP, moving towards the wireless AP, or moving away from the wireless AP, the method may include using an appropriate rate probing interval of the determined rate probing intervals, an appropriate frame retransmission limit of the determined frame retransmission limits, and an appropriate PER smoothing factor of the determined PER smoothing factors to determine a MCS value from a plurality of available MCS values to be used for transmitting data between the device and the wireless AP. For example, referring to FIG. 1, the MCS determination module 114 may use an appropriate rate probing interval of the determined rate probing intervals, an appropriate frame retransmission limit of the determined frame retransmission limits, and an appropriate PER smoothing factor of the determined PER smoothing factors to determine a MCS value from a plurality of available MCS values to be used for transmitting data between the device 104 and the wireless AP 106.

According to an example, for the method 400, determining whether a device is static relative to a wireless AP, moving towards the wireless AP, or moving away from the wireless AP further comprises determining a ToF for a signal transmitted between the device 104 and the wireless AP 106.

According to an example, for the method 400, determining whether a device is static relative to a wireless AP, moving towards the wireless AP, or moving away from the wireless AP further comprises sending a NULL data frame from one of the device 104 and the wireless AP 106 to determine a ToF for a signal transmitted between the device 104 and the wireless AP 106 based on receipt of an acknowledgement from the other one of the device 104 and the wireless AP 106.

According to an example, for the method 400, determining whether a device is static relative to a wireless AP, moving towards the wireless AP, or moving away from the wireless AP further comprises evaluating changes in ToF for signals transmitted between the device 104 and the wireless AP 106.

According to an example, in response to a determination that the device is static relative to the wireless AP, for the method 400, using an appropriate rate probing interval of the determined rate probing intervals, an appropriate frame retransmission limit of the determined frame retransmission limits, and an appropriate PER smoothing factor of the determined PER smoothing factors to determine a MCS value from a plurality of available MCS values to be used for transmitting data between the device and the wireless AP further comprises using the device static rate probing interval as the appropriate rate probing interval of the determined rate probing intervals, the second frame retransmission limit as the appropriate frame retransmission limit of the determined frame retransmission limits, and the device static PER smoothing factor as the appropriate PER smoothing factor of the determined PER smoothing factors to determine the MCS value from the plurality of available MCS values to be used for transmitting data between the device and the wireless AP.

According to an example, in response to a determination that the device is moving towards the wireless AP, for the method 400, using an appropriate rate probing interval of the determined rate probing intervals, an appropriate frame retransmission limit of the determined frame retransmission limits, and an appropriate PER smoothing factor of the determined PER smoothing factors to determine a MCS value from a plurality of available MCS values to be used for transmitting data between the device and the wireless AP further comprises using the device moving rate probing interval as the appropriate rate probing interval of the determined rate probing intervals, the first frame retransmission limit as the appropriate frame retransmission limit of the determined frame retransmission limits, and the device moving PER smoothing factor as the appropriate PER smoothing factor of the determined PER smoothing factors to determine the MCS value from the plurality of available MCS values to be used for transmitting data between the device and the wireless AP.

According to an example, in response to a determination that the device is moving away from the wireless AP, for the method 400, using an appropriate rate probing interval of the determined rate probing intervals, an appropriate frame retransmission limit of the determined frame retransmission limits, and an appropriate PER smoothing factor of the determined PER smoothing factors to determine a MCS value from a plurality of available MCS values to be used for transmitting data between the device and the wireless AP further comprises using the device static rate probing interval as the appropriate rate probing interval of the determined rate probing intervals, the second frame retransmission limit as the appropriate frame retransmission limit of the determined frame retransmission limits, and the device moving PER smoothing factor as the appropriate PER smoothing factor of the determined PER smoothing factors to determine the MCS value from the plurality of available MCS values to be used for transmitting data between the device and the wireless AP.

According to an example, for the method 400, the device static rate probing interval is greater than the device moving rate probing interval.

According to an example, for the method 400, the device static PER smoothing factor is greater than the device moving PER smoothing factor.

Referring to FIG. 5, for the method 500, at block 502, the method may include determining whether a device is static relative to a wireless AP, or moving relative to the wireless AP. For example, referring to FIG. 1, the ToF determination module 102 may determine whether the device is static relative to the wireless AP 106, or moving relative to the wireless AP 106.

At block 504, the method may include determining a rate probing interval, a frame retransmission limit, and a PER smoothing factor based on whether the device is determined to be static relative to the wireless AP, or moving relative to the wireless AP to determine a MCS value from a plurality of available MCS values to be used for transmitting data between the device and the wireless AP. For example, referring to FIG. 1, the rate probing interval determination module 108, the frame retransmission limit determination module 110, and the PER smoothing factor determination module 112 may respectively determine a rate probing interval, a frame retransmission limit, and a PER smoothing factor based on whether the device is determined to be static relative to the wireless AP, or moving relative to the wireless AP, and the MCS determination module 114 may determine a MCS value from a plurality of available MCS values to be used for transmitting data between the device and the wireless AP.

Figure 6:
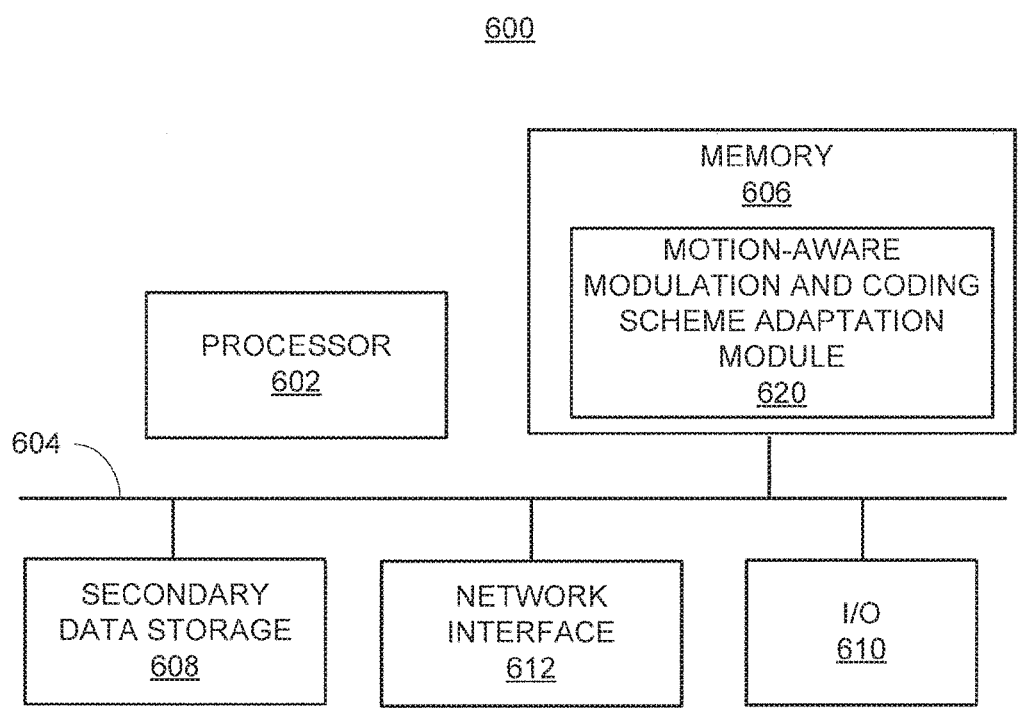
FIG. 6 illustrates a computer system, according to an example of the present disclosure.

FIG. 6 shows a computer system 600 that may be used with the examples described herein. The computer system 600 may represent a generic platform that includes components that may be in a server or another computer system. The computer system 600 may be used as a platform for the apparatus 100. The computer system 600 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 may include a processor 602 that may implement or execute machine readable instructions performing some or all of the methods, functions and other processes described herein. Commands and data from the processor 602 may be communicated over a communication bus 604. The computer system may also include a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include a motion-aware MCS adaptation module 620 including machine readable instructions residing in the memory 606 during runtime and executed by the processor 602. The motion-aware MCS adaptation module 620 may include the modules of the apparatus 100 shown in FIG. 1.

The computer system 600 may include an I/O device 610, such as a keyboard, a mouse, a display, etc. The computer system may include a network interface 612 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for motion-aware modulation and coding scheme (MCS) adaptation, the method comprising:
    determining whether a device is static relative to a wireless access point (AP), moving towards the wireless AP, or moving away from the wireless AP;
    determining a device static rate probing interval and a device moving rate probing interval to determine how frequently the wireless AP is to use a higher MCS value for data transmission to the device;
    determining first and second frame retransmission limits to determine a number of times a failed frame transmission is to be retried with a same MCS value before using a lower MCS value, wherein the first frame retransmission limit is greater than the second frame retransmission limit;
    determining a device static packet error ratio (PER) smoothing factor and a device moving PER smoothing factor to maintain a PER history for rate evaluation; and
    in response to a determination that the device is static relative to the wireless AP, moving towards the wireless AP, or moving away from the wireless AP, using an appropriate rate probing interval of the determined rate probing intervals, an appropriate frame retransmission limit of the determined frame retransmission limits, and an appropriate PER smoothing factor of the determined PER smoothing factors to determine, by a processor, a MCS value from a plurality of available MCS values to be used for transmitting data between the device and the wireless AP, thereby using the determined MCS value that is a relatively best MCS value to minimize performance degradation.

2. The method of claim 1, wherein determining whether a device is static relative to a wireless AP, moving towards the wireless AP, or moving away from the wireless AP further comprises:
    determining a time-of-flight (ToF) for a signal transmitted between the device and the wireless AP.

3. The method of claim 1, wherein determining whether a device is static relative to a wireless AP, moving towards the wireless AP, or moving away from the wireless AP further comprises:
    sending a NULL data frame from one of the device and the wireless AP to determine a time-of-flight (ToF) for a signal transmitted between the device and the wireless AP based on receipt of an acknowledgement from the other one of the device and the wireless AP.

4. The method of claim 1, wherein determining whether a device is static relative to a wireless AP, moving towards the wireless AP, or moving away from the wireless AP further comprises:
    evaluating changes in time-of-flight (ToF) for signals transmitted between the device and the wireless AP.

5. The method of claim 1, wherein in response to a determination that the device is static relative to the wireless AP, using an appropriate rate probing interval of the determined rate probing intervals, an appropriate frame retransmission limit of the determined frame retransmission limits, and an appropriate PER smoothing factor of the determined PER smoothing factors to determine a MCS value from a plurality of available MCS values to be used for transmitting data between the device and the wireless AP further comprises:
    using the device static rate probing interval as the appropriate rate probing interval of the determined rate probing intervals, the second frame retransmission limit as the appropriate frame retransmission limit of the determined frame retransmission limits, and the device static PER smoothing factor as the appropriate PER smoothing factor of the determined PER smoothing factors to determine the MCS value from the plurality of available MCS values to be used for transmitting data between the device and the wireless AP.

6. The method of claim 1, wherein in response to a determination that the device is moving towards the wireless AP, using an appropriate rate probing interval of the determined rate probing intervals, an appropriate frame retransmission limit of the determined frame retransmission limits, and an appropriate PER smoothing factor of the determined PER smoothing factors to determine a MCS value from a plurality of available MCS values to be used for transmitting data between the device and the wireless AP further comprises:
    using the device moving rate probing interval as the appropriate rate probing interval of the determined rate probing intervals, the first frame retransmission limit as the appropriate frame retransmission limit of the determined frame retransmission limits, and the device moving PER smoothing factor as the appropriate PER smoothing factor of the determined PER smoothing factors to determine the MCS value from the plurality of available MCS values to be used for transmitting data between the device and the wireless AP.

7. The method of claim 1, wherein in response to a determination that the device is moving away from the wireless AP, using an appropriate rate probing interval of the determined rate probing intervals, an appropriate frame retransmission limit of the determined frame retransmission limits, and an appropriate PER smoothing factor of the determined PER smoothing factors to determine a MCS value from a plurality of available MCS values to be used for transmitting data between the device and the wireless AP further comprises:
    using the device static rate probing interval as the appropriate rate probing interval of the determined rate probing intervals, the second frame retransmission limit as the appropriate frame retransmission limit of the determined frame retransmission limits, and the device moving PER smoothing factor as the appropriate PER smoothing factor of the determined PER smoothing factors to determine the MCS value from the plurality of available MCS values to be used for transmitting data between the device and the wireless AP.

8. The method of claim 1, wherein the device static rate probing interval is greater than the device moving rate probing interval.

9. The method of claim 1, wherein the device static PER smoothing factor is greater than the device moving PER smoothing factor.

10. A motion-aware modulation and coding scheme (MCS) adaptation apparatus comprising:
a processor; and
a memory storing machine readable instructions that when executed by the processor cause the processor to:
determine whether a device is static relative to a wireless access point (AP), moving towards the wireless AP, or moving away from the wireless AP by determining time-of-flight (ToF) for signals transmitted between the device and the wireless AP;
determine a rate probing interval, a frame retransmission limit, and a packet error ratio (PER) smoothing factor; and
in response to a determination that the device is static relative to the wireless AP, moving towards the wireless AP, or moving away from the wireless AP, use the determined rate probing interval, the frame retransmission limit, and the PER smoothing factor to determine a MCS value from a plurality of available MCS values to be used for transmitting data between the device and the wireless AP, thereby using the determined MCS value that is a relatively best MCS value to minimize performance degradation.

11. The motion-aware MCS adaptation apparatus according to claim 10, wherein the device is one of a smartphone and a tablet.

12. The motion-aware MCS adaptation apparatus according to claim 10, wherein the machine readable instructions to determine whether a device is static relative to a wireless AP, moving towards the wireless AP, or moving away from the wireless AP by determining ToF for signals transmitted between the device and the wireless AP, when executed by the processor, further cause the processor to:
evaluate changes in the ToF for the signals transmitted between the device and the wireless AP.

13. A non-transitory computer readable medium having stored thereon machine readable instructions to provide motion-aware modulation and coding scheme (MCS) adaptation, the machine readable instructions, when executed, cause a processor to:
determine whether a device is static relative to a wireless access point (AP), or moving relative to the wireless AP; and
determine a rate probing interval, a frame retransmission limit, and a packet error ratio (PER) smoothing factor based on whether the device is determined to be static relative to the wireless AP, or moving relative to the wireless AP to determine a MCS value from a plurality of available MCS values to be used for transmitting data between the device and the wireless AP, thereby using the determined MCS value that is a relatively best MCS value to minimize performance degradation.

14. The non-transitory computer readable medium of claim 13, wherein the machine readable instructions to determine whether a device is static relative to a wireless AP, or moving relative to the wireless AP, further cause the processor to:
send a NULL data frame from one of the device and the wireless AP to determine a time-of-flight (ToF) for a signal transmitted between the device and the wireless AP based on receipt of an acknowledgement from the other one of the device and the wireless AP.

15. The non-transitory computer readable medium of claim 13, wherein the machine readable instructions to determine whether a device is static relative to a wireless AP, or moving relative to the wireless AP, further cause the processor to:
evaluate changes in time-of-flight (ToF) for signals transmitted between the device and the wireless AP.

* * * * *